United States Patent
Holmes et al.

(10) Patent No.: US 10,118,702 B2
(45) Date of Patent: Nov. 6, 2018

(54) WATER MANAGEMENT SYSTEM

(71) Applicant: MAG Aerospace Industries, LLC, Carson, CA (US)

(72) Inventors: Keith Holmes, Huntington Beach, CA (US); Razmik B. Boodaghians, Glendale, CA (US); John Yu, Diamond Baar, CA (US)

(73) Assignee: MAG Aerospace Industries, LLC, Carson, CA (US)

( * ) Notice: Subject to any disclaimer, the term of this patent is extended or adjusted under 35 U.S.C. 154(b) by 0 days.

(21) Appl. No.: 15/728,326

(22) Filed: Oct. 9, 2017

(65) Prior Publication Data
US 2018/0029708 A1 Feb. 1, 2018

Related U.S. Application Data

(63) Continuation-in-part of application No. 15/434,227, filed on Feb. 16, 2017, now Pat. No. 9,783,308, which is a continuation-in-part of application No. 14/316,976, filed on Jun. 27, 2014.

(60) Provisional application No. 61/839,936, filed on Jun. 27, 2013.

(51) Int. Cl.
*B64D 11/00* (2006.01)
*B64C 1/14* (2006.01)

(52) U.S. Cl.
CPC ............ *B64D 11/00* (2013.01); *B64C 1/1453* (2013.01)

(58) Field of Classification Search
CPC ....... E03B 1/042; B64C 1/1453; B64C 1/067; B64D 11/00
See application file for complete search history.

(56) References Cited

U.S. PATENT DOCUMENTS

| 3,867,244 A | 2/1975 | Adams |
| 4,715,561 A | 12/1987 | Spinosa et al. |
| 5,218,838 A | 6/1993 | Kitamoto et al. |
| 6,143,185 A | 11/2000 | Tracy et al. |
| 6,216,285 B1 | 4/2001 | Olin |
| 6,435,452 B1 | 8/2002 | Jones |
| 7,124,772 B1 | 10/2006 | Browning |
| 8,074,933 B2 | 12/2011 | Mackulin et al. |

(Continued)

FOREIGN PATENT DOCUMENTS

| DE | 102011001267 | 9/2012 |
| EP | 3013682 | 5/2016 |
| WO | 2014210413 | 12/2014 |

OTHER PUBLICATIONS

U.S. Appl. No. 15/434,227, Notice of Allowance dated Jun. 30, 2017.

(Continued)

*Primary Examiner* — Craig Schneider
*Assistant Examiner* — Angelisa L Hicks
(74) *Attorney, Agent, or Firm* — Kilpatrick Townsend & Stockton LLP; Dean W. Russell; Kristin M. Crall

(57) ABSTRACT

Embodiments of the present invention provide a water management system for use on board a passenger transport vehicle. The water management system may be used to address and manage excess humidity, water leaks, or any other instance when water or other liquid may collect at a certain location. The disclosure provides a system for managing excess water and for optionally delivering the water to another location. The removal location may be a disposal outlet or it may be a beneficial use of the collected water on-board the vehicle.

24 Claims, 5 Drawing Sheets

(56) References Cited

U.S. PATENT DOCUMENTS

| | | |
|---|---|---|
| 8,245,974 B2 | 8/2012 | Paul |
| 9,783,308 B2 | 10/2017 | Holmes et al. |
| 2003/0066293 A1 | 4/2003 | Wilcox |
| 2003/0211291 A1 | 11/2003 | Castiglione et al. |
| 2006/0223200 A1 | 10/2006 | Maruyama |
| 2006/0225200 A1 | 10/2006 | Wierenga |
| 2007/0164158 A1 | 7/2007 | Buchholz et al. |
| 2010/0125938 A1 | 5/2010 | Billon |
| 2015/0000749 A1 | 1/2015 | Holmes et al. |
| 2017/0158335 A1 | 6/2017 | Holmes et al. |

OTHER PUBLICATIONS

International Application No. PCT/US2014/044489, International Preliminary Report on Patentability dated Jan. 7, 2016.
International Application No. PCT/US2014/044489, International Search Report and Written Opinion dated Oct. 24, 2014.
U.S. Appl. No. 14/316,976, Non-Final Rejection dated Dec. 1, 2015.
U.S. Appl. No. 14/316,976, Final Rejection dated Apr. 15, 2016.
U.S. Appl. No. 14/316,976 Advisory Action dated Jul. 1, 2016.
U.S. Appl. No. 14/316,976, Non-Final Rejection dated Aug. 10, 2016.
U.S. Appl. No. 14/316,976, Final Rejection dated Jan. 26, 2017.
Europe Patent Application No. 14742652.2, Communication Under Rule 71(3) EPC (Intention to Grant) dated Dec. 5, 2017.
Europe Patent Application No. 14742652.2, Decision to Grant Pursuant to Article 971(1) EPC dated Apr. 19, 2018.

WATER MANAGEMENT SYSTEM

CROSS REFERENCE TO RELATED APPLICATIONS

This application is a continuation-in-part of U.S. application Ser. No. 15/434,227 filed Feb. 16, 2017 titled "Water Management System," which application is a continuation-in-part of U.S. application Ser. No. 14/316,976, filed Jun. 27, 2014, titled "Water Management System," which application claims the benefit of U.S. Provisional Application Ser. No. 61/839,936, filed Jun. 27, 2013, titled "Excess Humidity Water Management System," the entire contents of each of which are hereby incorporated by reference.

FIELD OF THE DISCLOSURE

Embodiments of the present disclosure relate generally to a water management system for use on board a passenger transport vehicle. The water management system may be used to address and manage excess humidity, water leaks, or any other instance when water or other liquid may collect at a certain location. The disclosure provides a system for managing excess water and for optionally delivering the water to another location. The removal location may be a disposal outlet or it may be a beneficial use of the collected water on-board the vehicle.

BACKGROUND

Passenger transport vehicles, such as commercial aircraft (and especially aircraft with low cabin altitude) experience humidity and other moisture-laden conditions. This can particularly be the case for aircraft that operate in high humidity environments and/or aircraft that employ humidification systems at various locations on-board the vehicle. As such, aircraft (and other vehicles) can have "rain in the plane," which is a condition that occurs when excess water accumulates on insulation blankets or other equipment in the bilge or belly of the aircraft or vehicle. In many instances, this can lead to saturated insulation blankets and excessive operational weight.

The "excess" water that creates this problem may be from any number of sources. For example, it may the result of passenger's exhaling normal breaths, humidification systems, condensation, ovens, coffee makers, ambient humidity (e.g., on ground), or any other cause.

Various attempted solutions at managing increased humidity as it condenses on the cold structure of the aircraft (and the resulting "rain in the plane") have generally involved low tech solutions such as using wicking material in strategic places and providing revised drain paths to cause the water to move efficiently from the cabin of the aircraft to the bilge. For example, one solution has been to position spring-loaded drain valves in the belly of an aircraft. The valves open when the aircraft lands to remove moisture or water that may have collected during flight. Another solution has been to line the belly with insulation blankets that absorb collected moisture and water (but that need to be removed and dried.) More effective solutions are desired.

BRIEF SUMMARY

Embodiments described herein thus provide a water management system that is designed to remove moisture, water, or any other liquid away from an identified location. The water management system moves the water to another location (a removal location), which may be a disposal location or a location that allows re-use of the removed water/moisture. Particular embodiments are designed for use on passenger transport vehicles, such as aircraft, that may experience a collection of water or moisture, typically along a lower level or belly area of the vehicle.

BRIEF DESCRIPTION OF THE DRAWINGS

FIG. 5A shows one embodiment of an artificial haircell concept. FIG. 5B shows a graph illustrating sensor output versus inflow velocity. FIG. 5C shows a graph illustrating peak to peak voltage versus cycle. FIG. 5C illustrates a schematic flow chart of process steps for use with an artificial haircell sensor.

DETAILED DESCRIPTION

Embodiments of the present disclosure provide a water management system 10 that is designed to remove moisture, water, or any other liquid away from an identified location. The water management system 10 moves the water to another location, which may be a disposal location or a location that allows re-use of the removed water/moisture. Particular embodiments are designed for use on passenger transport vehicles that may experience a collection of water or moisture, typically along a lower level or belly area of the vehicle. The below disclosure focuses on the use of the water management system 10 in connection with a passenger aircraft. However, it should be understood that other vehicles may experience water collection or moisture condensation and one may find various embodiments described herein useful for those applications as well.

Figure 1:
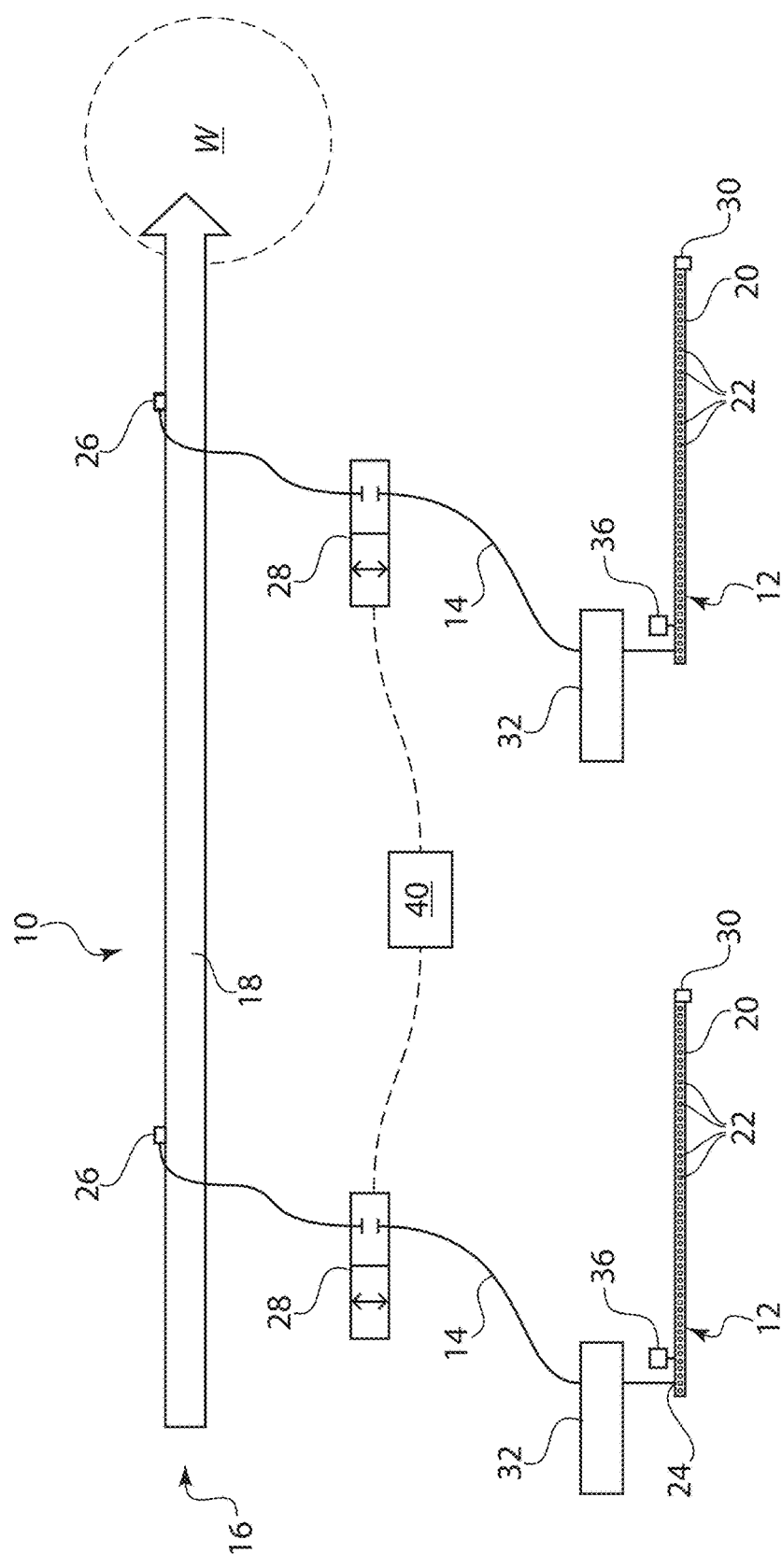
FIG. 1 shows a schematic view of a water management system according to one embodiment of the disclosure, using a tube or flex line for water collection.

FIG. 1 shows one embodiment of a water management system 10. The system is particularly designed for managing and removing excess humidity or other forms of condensation that may collect at an identified location. In many instances, the system 10 will find particular use in the belly of an aircraft, where "rain in the plane" is often a challenge to manage. As described further below, however, the system 10 may also be used to detect leaks that may occur in the location of the system 10. It is envisioned that the system be operable during an entire flight duration, such that it can manage moisture or water throughout the entirety of the flight. This includes time that the aircraft is at flying altitudes and subject to a pressure differential between cabin pressure and outside pressure.

The water management system 10 described can be located in one or multiple locations in the aircraft belly area, which is one location where water or other forms of moisture are known or observed to accumulate. The concept can be adapted to single aisle, twin aisle, or even double deck aircraft with any passenger capacity.

As shown in FIG. 1, the water management system 10 includes a collection device 12 and a conduit 14 for directing the collected water away from the water collection device 14. The conduit 14 is located between the water collection device 12 and a location 16 to which the moisture is to be removed. This may be referred to as a "removal location 16." (As described below, the removal location 16 may be a drain mast, on-board water lines, the on-board waste tank, a filtering system, a grey water re-use system, a humidifier system, or any other desired location.) In FIG. 1, the removal location 16 is shown as a waste line 18 leading to the on-board waste tank W.

Referring now more specifically to the collection device 12, the embodiment of FIG. 1 is shown as a tube 20 or flex line. The tube 20 may be manufactured from any appropriate material or combination of materials, and is preferably corrosion resistant. Non-limiting examples of potential tube 20 materials include polymers, rubbers, silicones, glasses, metallic materials or alloys thereof (such as copper, stainless steel), or any other appropriate materials. The tube 20 may be manufactured from or impregnated with Microban™, which is used to produce anti-microbial plastic sheets via impregnation with Diisoibutylphenoxyethoxy ethyl dimethyl benzyl ammonium chloride monohydrate, or an equivalent biocide. If the water collection device 12 is a metal-like material, it may be manufactured from or coated with Teflon or some other corrosion resistant coating to prevent corrosion and scale build-up.

The very nature of water being collected can mean that particulates and other contaminants will be handled by the water collection device 12. Accordingly, additionally or alternatively the tube 20 may have one or more other anti-microbial agents coating the tube, sprayed onto the tube, impregnated in the tube, or otherwise associated with the tube. The one or more anti-microbial agents may be provided in order to prevent growth of bacteria, viruses, algae, parasites, or any other undesirable growth that may otherwise occur from water that is collected within the tube. Thus, in some embodiments, one or more components of the water collection device 12 (including the interior and/or the exterior) may be treated or associated with one or more antimicrobial or biocide compositions. The term "antimicrobial" is used herein to encompass, but not be limited to, all potential compounds that kill or inhibit the growth of bacteria, fungus, mold, mildew, parasites, microorganisms, viruses, and any other unwanted species that may grow in a space. The term is intended to encompass, but not be limited to, any types of antimicrobials, antiseptics, disinfectants, biocides, sterilizers, deodorizers, decontaminants, purifiers, or any other substances that inhibit, treat, and/or prevent or inhibit unwanted growth of any of the above-described or other species. Various types of anti-microbial chemistry are known, but non-limiting examples of potential materials that may be used may be manufactured by any number of chemical companies (non-limiting examples of which include Dow Chemical, BASF, DuPont, Microban, Total Science Antiseptic Solutions, and/or Eastman Chemical). Providing treatment with an antimicrobial can help ensure that any unclean fluid, whether air or liquid, that may come into contact with the water collection device tube 20 does not create microbial growth.

The tube 20 may be sized to have any desired diameter. In one embodiment, the diameter of the tube 20 is about 0.25 inches to about one inch. In a particular embodiment, its diameter is about ½ inch. In alternate embodiments, the tube may have a larger or smaller diameter, depending upon the space being serviced and the size of the vehicle being serviced.

As shown in FIG. 1, the tube 20 may have one or more areas for receiving moisture 22. These areas for receiving moisture 22 may be perforations, openings, or holes into which moisture may flow or otherwise may be pulled into the tube 20 via an appropriate force. The areas 22 may be any size, as long as they allow moisture or water to collect, pool, seep, flow, or otherwise enter the tube 20.

In the embodiment shown in FIG. 1, the conduit 14 fluidly connects the collection device 12 to a waste tank line 18. One end of the tube 20 may be connected to or otherwise sealed from the open atmosphere by the conduit 14. The other end of the tube 20 may be sealed from the open atmosphere by a cap 30 or other closure device. In an alternate embodiment, the tube 20 is formed with one open end (for communicating with the conduit 14) and one closed end.

Due to connection of the tube 20 to the vacuum waste tank W via the conduit 14, the differential pressure/vacuum created along the waste tank line 18 functions to "pull" the moisture that enters the areas 22 into the line 18 (for ultimate delivery to the on-board waste tank). There is a conduit connection 24 on the collection device 12 side of the system, and a conduit connection 26 on the waste tank line 18 side of the system. These may be standard clam shell-type couplings that function as a connector to a waste tube pullout for the conduit connection. Any connection as per AS 1656 is possible and considered with the scope of this disclosure.

The conduit 14 may also be manufactured from any appropriate material or combination of materials, and it is also preferably corrosion resistant. Non-limiting examples of potential conduit 14 materials include polymers, rubbers, silicones, glasses, metallic materials or alloys thereof (such as copper, stainless steel), or any other materials. Additionally or alternatively, the conduit 14 may be manufactured from or impregnated with Microban™. If the conduit 14 is a metal-like material, it may be manufactured from or coated with Teflon or some other corrosion resistant coating to prevent corrosion and scale build-up.

The very nature of water being collected can mean that particulates and other contaminants will be handled by the conduit 14. Accordingly, additionally or alternatively the conduit 14 may have one or more other anti-microbial agents coating the conduit, sprayed onto the conduit, impregnated in the conduit, or otherwise associated with the conduit. The one or more anti-microbial agents may be provided in order to prevent growth of bacteria, viruses, algae, parasites, or any other undesirable growth that may otherwise occur from water that is collected within the tube. Thus, in some embodiments, one or more components of the conduit 14 (including the interior and/or the exterior) may be treated or associated with one or more antimicrobial or biocide compositions. The term "antimicrobial" is as defined above. Providing treatment with an antimicrobial can help ensure that any unclean fluid, whether air or liquid, that may come into contact with the conduit 14 does not create microbial growth.

The conduit 14 may be sized to have any desired diameter. In one embodiment, the diameter of the conduit 14 is about 0.25 inches to about ¾ inch. In one embodiment, its diameter is about ½ inch. In alternate embodiments, the conduit may have a larger or smaller diameter, depending upon the space being serviced and the size of the vehicle being serviced. The conduit 14 may be any appropriate length, as long as it creates a fluid connection between the water collection device 12 and the removal location 16.

Figure 2:
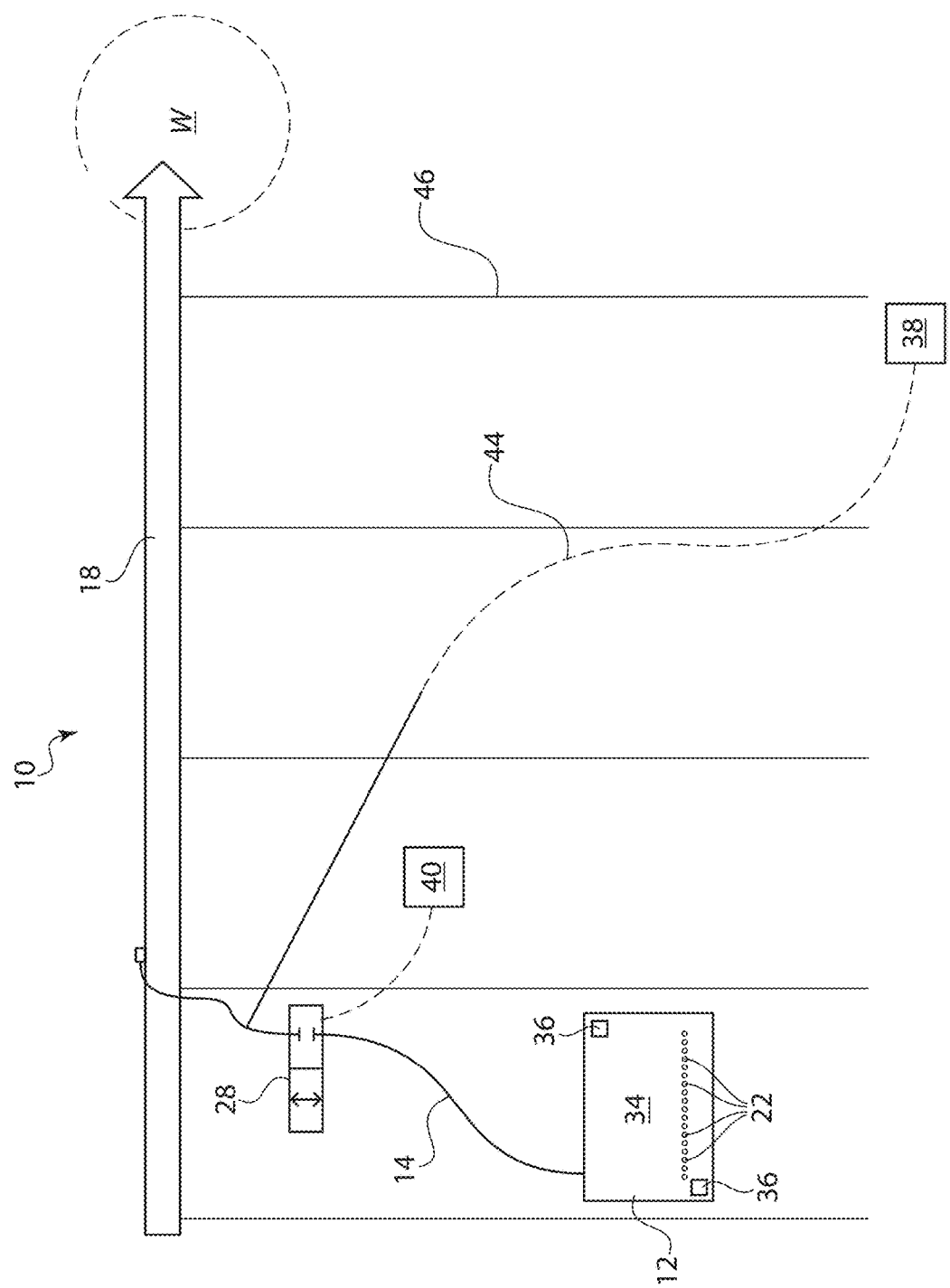
FIG. 2 shows a schematic of an alternate water management system.

FIG. 2 shows another embodiment for the water collection device 12. In this figure, the water collection device 12 is a mat 34. The mat 34 may be associated with a conduit 14 similar to that described above and may work similarly. One advantage of providing a mat 34 is that it can be custom shaped to fit certain zones, such as between stringers or any other location. The mat 34 will generally have one or more areas 22 for receiving moisture or water. The one or more areas 22 may be perforations, openings, or holes into which moisture or water may be able to flow or otherwise may be pulled into the mat 34 via an appropriate force. The areas 22 may be any size, as long as they allow moisture or water to collect, pool, seep, flow, or otherwise enter the mat 34. The mat may be formed of any appropriate material, options for which are described above in connection with the tube 20 embodiment of the water collection device 12. The mat 34 may also have one or more other anti-microbial agents coating the mat, sprayed onto the mat, impregnated in the mat, or otherwise associated with the mat. The one or more anti-microbial agents may be provided in order to prevent growth of bacteria, viruses, algae, parasites, or any other undesirable growth that may otherwise occur from water that is collected within the mat. Thus, in some embodiments, one or more components of the mat 34 (including the interior and/or the exterior) may be treated or associated with one or more antimicrobial or biocide compositions. The term "antimicrobial" is as defined above. Providing treatment with an antimicrobial can help ensure that any unclean fluid, whether air or liquid, that may come into contact with the mat 34 does not create microbial growth.

Figure 3:
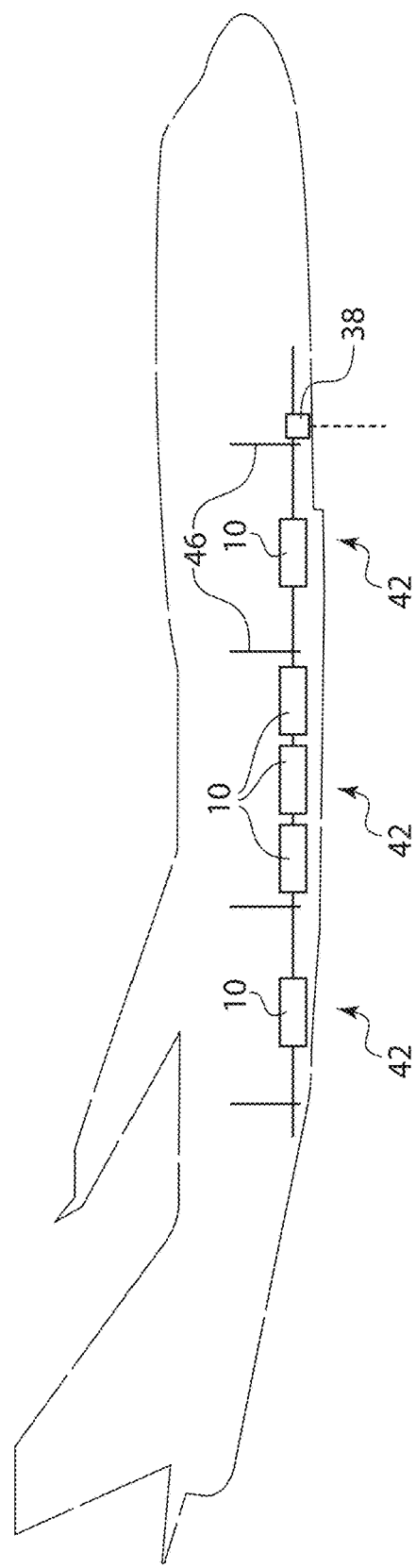
FIG. 3 shows a side view of an aircraft employing a water management system along various zones.

Whichever embodiment is used, one or more water collection device(s) 12 are generally located (and in most instances, secured) in designed troughs or known low points where water collects. For example, as shown in FIG. 3, the water collection device(s) 12 may be positioned in the aircraft belly at various zones 42. For example, one or more water management systems 10 (including the water collection device 12 and conduit that leads to the desired removal location) may be positioned along frames 46 and/or along stringers. The water collection device(s) may take any appropriate shape to fit into the desired zone, such as square, rectangular, circular, triangular, custom-shaped, tubular and wound around the zone or edges thereof, or any other desired configuration. The water collection device(s) may be secured via clips, adhesives, weights, or any other appropriate securing system. There may be a planned zone format, in which one or more water management systems 10 are positioned at various positions along the length of the aircraft. As shown, there may be one system 10 per zone or there may be multiple systems 10 per zone 42.

In some embodiments, the water collection device 12 and/or the conduit 14 may be heated. This can help prevent water from freezing in the system when the aircraft is at below-freezing temperatures. This may be accomplished via spot heating, a freeze protection jacket on at least a portion of the tube or conduit, or any other appropriate heating method. The general goal is to ensure the flow of water, even in low temperatures.

FIG. 1 also shows an optional descaling device 32 that may be positioned along the conduit line 14. This can help prevent build-up scale formation along the conduit 14, particularly if the conduit used has a small diameter.

Along the conduit 14, there is a valve 28 provided that functions to control the passage of moisture or water through the conduit 14. The valve 28 may be motor or solenoid operated. The valve 28 may be a two-port valve that has an open position and a closed position. The valves used in this system 10 may be controlled by a controller 40, which may be any of the Environmental Control System (ECS), motor (s), solenoid(s), pneumatic(s), vacuum system, a stand-alone controller, or any combination thereof. Whichever method of control is used, a waste tank "full" signal may be delivered to the controller 40 to inhibit operation and/or to indicate that the collected moisture/water should be routed elsewhere.

In one embodiment, the valve 28 may automatically cycle OPEN/CLOSED periodically during an entire flight duration. This includes time that the aircraft may be on the ground, as well as when the aircraft is at flying altitudes. Rain the plane often occurs during long flights, when condensation from aircraft equipment may occur. The valve 28 may cycle constantly throughout the flight, such as over various time intervals. In another embodiment, the valve 28 may receive an OPEN signal from a controller 40. Opening of the valve 28 pulls a vacuum on the conduit 14 connected to the water collection device 12. In flight, the naturally occurring pressure differential between the cabin to outside ambient pressure that occurs when the aircraft is at flying altitudes is used as the motive force to pull (via vacuum suction) the moisture or water into the water collection device 12 through the one or more areas for receiving moisture 22. (If the vehicle is on-ground or in another location where the pressure differential will not create a vacuum, a vacuum generator may be used to create the required air flow/pull to move the moisture/water). The moisture and/or water that has collected on the water collection device 12 is then transported via this air flow/vacuum created into the waste line(s) 18 and to the vacuum waste storage tank(s) W. (Other removal locations are also possible, and are described further below.)

In another embodiment, the valve 28 may open or close based on feedback from a water sensor. In this instance, a further benefit of the water management system 10 described is that it may be used for leak detection, as well as humidity/condensation management. In the leak detection aspect, the water collection device 12 may be provided with one or more water sensors 36. The water collection devices 12 (whether tube or mat portions) can be designed as module units that have the capability of being fitted with adjustable sensors 36 for detecting and monitoring potential water accumulation spots in several critical sections of the water management system 10. The monitoring can take place in real-time, by automatically detecting change in level/height of moisture or water (whether the condensate and/or a leak that creates a collection of water in one or more locations). The detection may be via a change in conductance of the sensor 36. The measured conductance based on senor output can be translated to electrical voltage or current reading to show the occurrence and location of the water accumulation, and be reflected on the on-board aircraft service computer or other output system. In other examples the change may be detected via piezoresistance, detected flow, pressure sensor, temperature sensor, or any combination thereof. The position of the modular water collection devices 12 which are fitted with sensors 36 could be selected based on the system layout to minimize distortion, which will decrease the chance of false readings by the sensors.

It is generally envisioned that the one or more water sensors 36 may be secured to, but slightly elevated from, the water collection device 12. In this way, the sensor 36 can detect whether an unexpected or undesired water rise has occurred in the location of the water collection device 12. An accompanying signaler may also be provided, which can deliver a signal to aircraft personnel (whether to the on-board crew, computer, or to an on-ground maintenance team) that a water leak may have occurred. The sensor 36/signaler system may also be in communication with the controller 40 for the valve 28, which could instruct the valve 28 to remain in an open position so that the water can be quickly removed.

In another embodiment, one or more sensors 36 may be embedded directly into water collection device(s) 12 along one or more zones of the aircraft, such that activation of a series of sensors would indicate that too much water has collected, which may evidence a leak. It is also possible for one or more sensors to be fitted in various sections of the aircraft water pipe and plumbing system. This can allow the one or more sensors to detect inflow velocity change.

Figures 5A, 5B, 5C, 5D:
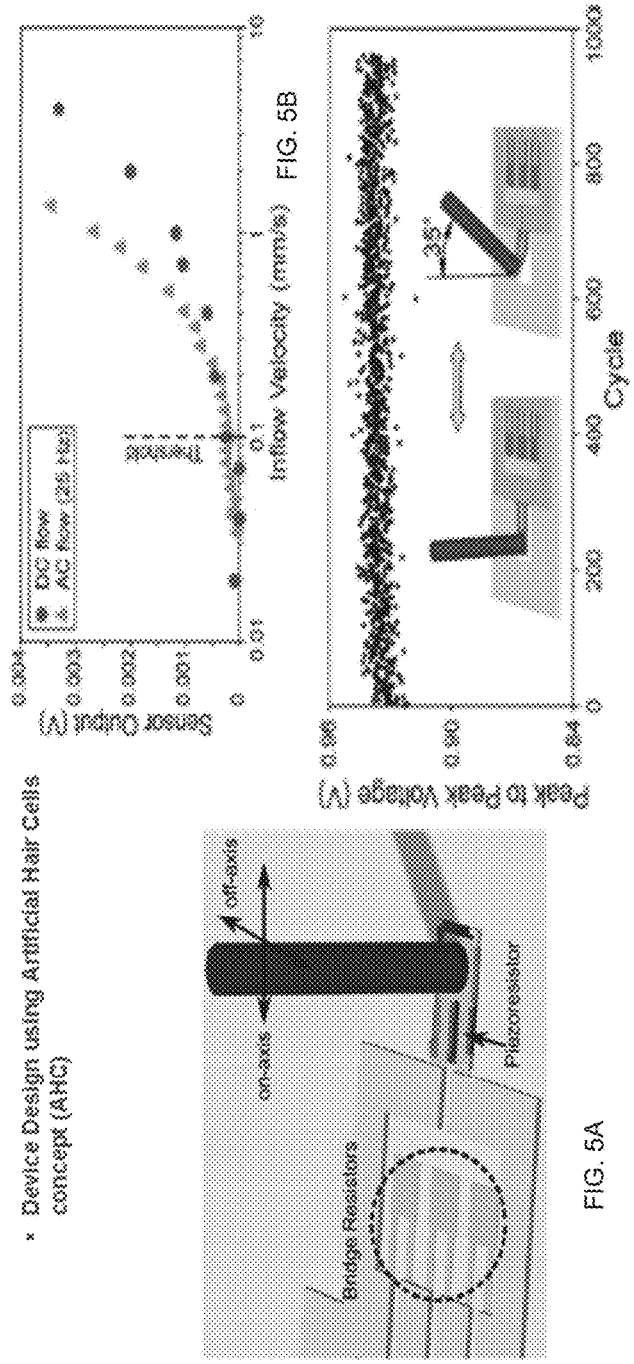
FIGS. 5A-5D illustrate various types of sensors that may be used in connection with the water management system disclosed.

A specific type of sensor that may be used in connection with the system described is an artificial haircell (AHC) sensor. One example is illustrated by FIG. 5A. Such sensors have a silicon cantilever beam with cilium attached at the distal end. These cilium is positioned perpendicular to a substrate plane, which may be a piezoresistor. Sensing is based on silicon piezoresistive strain gauged at the base of the cantilever. The motion of the cilium (much like a hair) protruding from the substrate is driven by oscillating movement of the fluid as a function of the cilium's physical dimensions, fluid properties, and flow conditions. The cilium may be made of an epoxy. One specific example is a photodefinable SU-8 epoxy. A specific example of such an AHC sensor (along with its potential, dimensions, fabrication, and use) is described by the article titled "*Design and Characterization of Artificial Haircell Sensor for Flow Sensing With Ultrahigh Velocity and Angular Sensitivity*," Chen et al., Journal of Micro-Electromechanical Systems, Vol. 16, No. 5, October 2007, incorporated by reference herein. This type of sensor may be used to sense flow in both water or air. It may be used to sense steady-state laminar flow and oscillatory flow. FIGS. 5B and 5C provide data illustrating various outputs, flow velocities, voltages and cycles for testing done on various AHCs.

Further sensor systems that may be used in connection with this disclosure include one or more smart hair sensors that are based on research conducted studying bat and/or cricket hairs. Lightweight sensors have been developed that mimic the hair sensors used by these animals using carbon nanotubes. Carbon nanotubes have a high strength-to-weight ratio and can conduct electricity, while also having a very small diameter. When air flows over the fiber, it can cause a change in the resistance between the electrodes, creating the sensor function. Examples are shown and described by the article "*Bio-inspired: crickets, that inspire AFRL researchers to develop smart 'hair' sensors for flight*," Novobilski, et al., Air Force Research Laboratory, published May 8, 2017.

It is possible for a smart hair sensor to be positioned within any of the conduits of the water management system. It is further possible for a smart hair sensor to be retrofitted into an existing aircraft water piping/handling system. In this example, a section of existing pipe may be cut and replaced with a section of pipe that has a pre-fitted smart hair sensor to position the sensor into the aircraft water system. This can help provide a health monitoring system. For example, if the pipe becomes clogged, the smart hair sensor can monitor a change/drop in velocity of flow before the clog becomes a problem. Such monitoring can lead to improved maintenance of the aircraft water management system, resulting in fewer flight interruptions. Additionally, reduction in maintenance costs can lead to an improved return on investment and a higher standard of service.

An additional sensor system that may be used in connection with this disclosure is the sensor system shown, tested, and described in the article "Smart Pipe: *Nanosensors for Monitoring Water Quantity and Quality in Public Water Systems*," Lin, et al., Contract Report 2009-11; MTAC Report TR09-03, Illinois State Water Survey, published by the Institute of natural resource sustainability, University of Illinois at Urbana-Champaign. That sensor packages individual sensors into one sensor unit. The individual sensors are a pressure sensor, a temperature sensor, and two flow sensors (one measuring in the X direction and one measuring in the Y direction). These sensors were used to measure in municipal water systems, when used in connection with the present disclosure, the sensors may be positioned within the water collection device 12, or along any of the conduits or lines described herein.

Monitoring of any of the water sensors described herein may be done wirelessly. This can allow personnel to detect a problem from a control panel located remote from the water management system. The control panel may be positioned on-board the vehicle. The control panel may be positioned on a ground monitoring location, with information relayed wirelessly. Receiving device may be a tablet, hand held tablet, computer, smart phone, personal communication device, mainframe computer, aircraft maintenance computer when the aircraft is on the ground, or any other appropriate receiving system.

Figure 4:
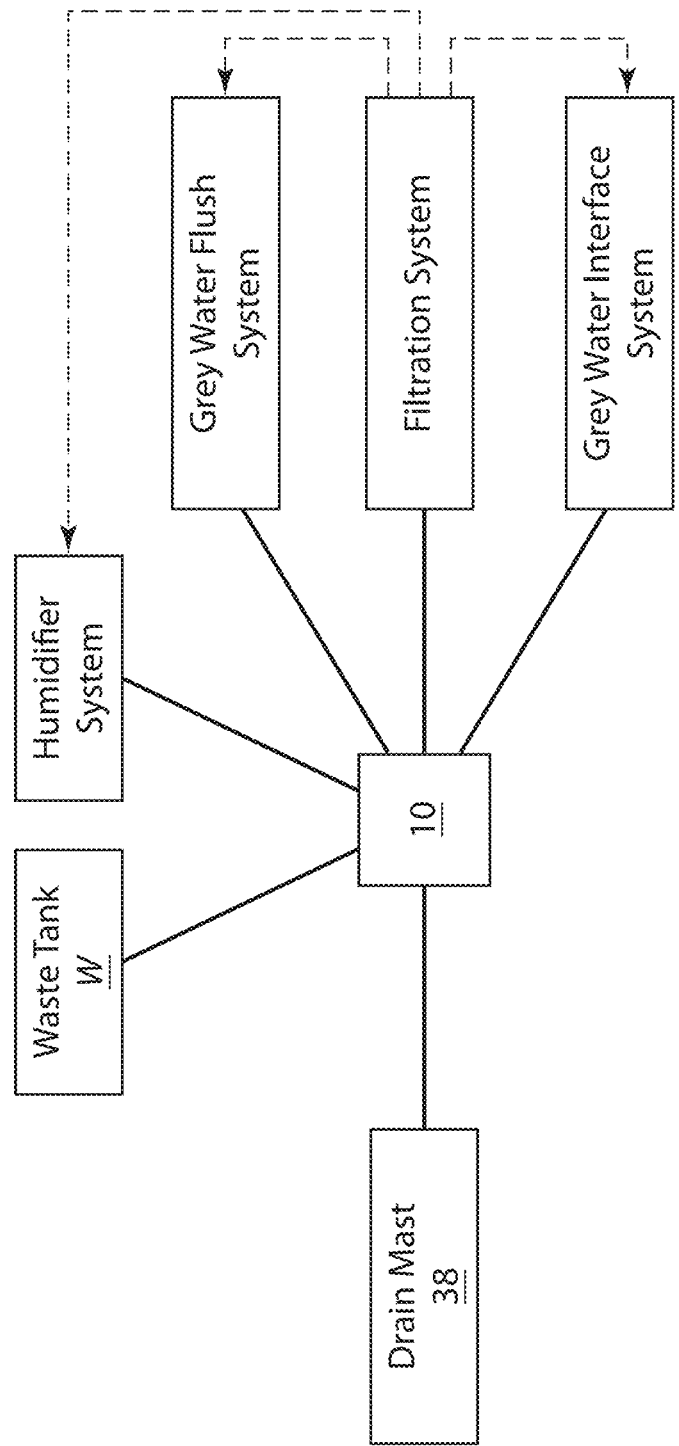
FIG. 4 is a flow chart that show optional removal locations for the collected water.

The water that has been collected in the water collection device 12 (whether from natural condensate or humidity or from a water leak) should be removed and transported to a removal location. This may be the on-board waste tank, as described above and as shown in FIGS. 1 and 2. However, the collected moisture or water may also be delivered to other locations if desired. Non-limiting examples of potential removal locations are shown in FIG. 4. A control system may be provided that directs the activities of FIG. 4 and directs collected water to a desired removal location.

For example, if the water is to be disposed (and not re-used), one option is for the conduit 14 to lead directly to a drain mast 38 for disposal of the water outside the aircraft. Another option is for the conduit 14 to lead to another line 44 that is already directed toward the drain mast 38. (For example, some aircraft dispose of grey water from galley sinks overboard. A conduit 14 may join a line leaving a galley sink so that the collected water joins the grey water that is directed to the drain mast 38 for disposal.) These options are shown in FIGS. 2 and 3.

In other embodiments, it may be desirable to re-use the collected water. For example, in one embodiment, the collected water may be delivered to a filtration system. One example of such a filtration system may be the mixed fluid filtration system shown and described in co-pending application Publication No. 2014/0138326. A filtration system may be used to clean or otherwise filter the collected water for a subsequent use.

Additionally or alternatively, the water may be routed to another removal location, such as a grey water flush system for use in flushing vacuum toilets (examples of which are described in co-pending application Publication No. 2013/0305444 and U.S. Ser. No. 62/011,229). In this option, the water collected by the water management system 10 may be re-used for flushing on-board toilets. The vacuum created by the vacuum flush system may be used to pull the collected water to a reservoir or accumulator or other holding tank for the water. The water may be routed through a filtering system or may be directed directly to a flush water holding tank. In another option, the collected water may be routed to a grey water interface system, such as described in co-pending U.S. application Ser. No. 14/284,726.

It is also possible to deliver the collected water to an on-board humidifier system (once the collected water has been cleaned and/or appropriately filtered). Any of these removal locations are considered within the scope of this disclosure and based on this disclosure and the referenced disclosures, one would understand how to route the collected water into the various options provided.

Changes and modifications, additions and deletions may be made to the structures and methods recited above and shown in the drawings without departing from the scope or spirit of the invention and the following claims.

What is claimed is:

1. A water management system for use on-board an aircraft, comprising:
    (a) a water collection device comprising one or more areas for receiving moisture or water, the water collection device fluidly coupled to a source of vacuum;
    (b) a conduit between the water collection device and a removal location to which the moisture or water is to be removed, through which there is created a pressure differential to cause the moisture or water to be pulled into and through the conduit;
    (c) a valve to control passage of moisture or water through the conduit;
    (d) a controller that directs opening and closing of the valve based on water levels sensed by a water sensor, wherein the valve is opened and closed periodically throughout an entire flight duration, wherein the water sensor comprises a flow detection sensor, a pressure sensor, a current sensor, a temperature sensor, or any combination thereof.

2. The water management system of claim 1, wherein the collection device comprises a tube.

3. The water management system of claim 2, wherein the tube comprises one or more perforations, openings, or holes into which moisture flows.

4. The water management system of claim 1, wherein the collection device comprises a mat.

5. The water management system of claim 4, wherein the mat comprises one or more perforations, openings, or holes into which moisture flows.

6. The water management system of claim 1, wherein the one or more areas for receiving moisture comprise perforations or openings.

7. The water management system of claim 1, wherein the water collection device, the conduit, or both are heated for freeze protection.

8. The water management system of claim 1, wherein at least a portion of the water collection device or the conduit or both is coated with, impregnated with, or associated with an anti-microbial agent.

9. The water management system of claim 1, wherein the water sensor comprises a water sensor for detecting leaks in the vehicle.

10. The water management system of claim 9, wherein the water sensor measures conductivity.

11. The water management system of claim 9, wherein the water sensor is mounted above the water collection device, fitted in various sections of the water piping and plumbing system to detect inflow velocity change, or both.

12. The water management system of claim 1, further comprising a descaling device.

13. The water management system of claim 1, wherein the water sensor comprises an artificial haircell sensor, a smart hair sensor, or both.

14. The water management system of claim 13, wherein the artificial haircell sensor comprises a cilium extending from a piezoelectric base.

15. The water management system of claim 13, wherein the smart hair sensor comprises carbon nanotubes.

16. The water management system of claim 1, wherein the water sensor functions via piezoresistance.

17. The water management system of claim 1, wherein the water sensor comprises a pressure sensor, a temperature sensor, and one or more flow sensors.

18. The water management system of claim 1, further comprising a control system that directs collected water to a desired removal location.

19. The method of claim 18, wherein the removal location comprises an aircraft drain mast, a filtration system, an aircraft grey water flush system, an aircraft humidifier system, an aircraft waste tank, or any combination thereof.

20. The water management system of claim 1, wherein the water sensor is retrofitted into the conduit.

21. The water management system of claim 1, wherein the water sensor is monitored wirelessly.

22. A method for collecting and removing undesired moisture or water from a location on an aircraft, comprising:
    (a) causing installation of a water management system on the aircraft, the water management system comprising:
        (i) a water collection device comprising one or more areas for receiving moisture or water; (ii) a conduit between the water collection device and a removal location to which the moisture or water is to be removed, through which there is created a pressure differential to cause the moisture to be pulled into and through the conduit; and (iii) a valve to control passage of moisture or water through the conduit wherein the valve is opened and closed periodically throughout an entire flight duration;
    (b) sensing presence of water via one or more water sensors; and
    (c) causing the water collected from the water collection device to be directed to the removal location.

23. The method of claim 22, wherein the removal location comprises an aircraft drain mast, a filtration system, an aircraft grey water flush system, an aircraft humidifier system, an aircraft waste tank, or any combination thereof.

24. The method of claim 22, wherein the water management system further comprises a control system that directs collected water to the removal location.

* * * * *